US009260075B2

(12) United States Patent
Young

(10) Patent No.: US 9,260,075 B2
(45) Date of Patent: Feb. 16, 2016

(54) SELF-ACTUATING FLOW RESTRICTOR FOR A VEHICLE AIRBAG ASSEMBLY

(71) Applicant: Ford Global Technologies, LLC, Dearborn, MI (US)

(72) Inventor: John A. Young, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 14/301,650

(22) Filed: Jun. 11, 2014

(65) Prior Publication Data

US 2015/0360640 A1    Dec. 17, 2015

(51) Int. Cl.
*B60R 21/206* (2011.01)
*B60R 21/276* (2006.01)
*B60R 21/239* (2006.01)
*B60R 21/231* (2011.01)

(52) U.S. Cl.
CPC .............. *B60R 21/276* (2013.01); *B60R 21/206* (2013.01); *B60R 21/239* (2013.01); *B60R 2021/2395* (2013.01); *B60R 2021/23169* (2013.01)

(58) Field of Classification Search
CPC ................. B60R 2021/2395; B60R 2021/165; B60R 2021/23169; B60R 2021/2765; B60R 21/239; B60R 21/206; B60R 21/276
USPC .................................... 280/730.1, 732, 743.1
See application file for complete search history.

(56) References Cited

U.S. PATENT DOCUMENTS

| 5,707,078 | A | 1/1998 | Swanberg et al. |
| 6,231,075 | B1 | 5/2001 | Otsu |
| 6,588,796 | B2 | 7/2003 | Webber et al. |
| 7,004,500 | B2 | 2/2006 | Dinsdale et al. |
| 8,454,054 | B1 * | 6/2013 | Raines ........................... 280/753 |
| 8,459,689 | B2 * | 6/2013 | Roychoudhury ........... 280/730.1 |
| 8,474,868 | B2 * | 7/2013 | Kalisz et al. ................... 280/753 |
| 8,544,879 | B1 | 10/2013 | Mazzocchi et al. |
| 2005/0189752 | A1 | 9/2005 | Itoga et al. |
| 2011/0031725 | A1 * | 2/2011 | Rose et al. ..................... 280/736 |
| 2011/0272926 | A1 * | 11/2011 | Roychoudhury et al. . 280/728.2 |
| 2012/0112439 | A1 * | 5/2012 | Roychoudhury ........... 280/728.3 |
| 2012/0267878 | A1 | 10/2012 | Kalisz et al. |
| 2013/0062866 | A1 | 3/2013 | Breed |
| 2013/0300093 | A1 | 11/2013 | Kalisz et al. |
| 2014/0151987 | A1 * | 6/2014 | Mazzocchi et al. ........... 280/739 |

FOREIGN PATENT DOCUMENTS

WO             9942340         8/1999

* cited by examiner

*Primary Examiner* — James English
(74) *Attorney, Agent, or Firm* — Vichit Chea; Price Heneveld LLP

(57) ABSTRACT

An inflatable airbag assembly includes first and second walls sealably connected to define an inflatable bladder having an interior volume that is operable between inflated and deflated states. At least one pleat is defined within at least one of the first and second walls, and defines an expanded portion of the interior volume. First and second slits are defined within the first wall that define a vent in communication with the expanded portion of the interior volume, wherein the vent defines an open position with the inflatable bladder in the deflated state, and wherein the vent moves to a closed position as the inflatable bladder operates to the inflated state.

20 Claims, 6 Drawing Sheets

SELF-ACTUATING FLOW RESTRICTOR FOR A VEHICLE AIRBAG ASSEMBLY

FIELD OF THE INVENTION

The present invention generally relates to vehicle airbag assemblies, and more specifically, a self-actuating flow restrictor for controlling the rate of inflation of a vehicular airbag assembly.

BACKGROUND OF THE INVENTION

Typically, vehicles include various airbag assemblies disposed in and around the passenger cabin of the vehicle. Depending upon the location of the airbag assembly within the vehicle, each airbag assembly can have specific properties, such as size and shape of the airbag when loaded and when deployed, rates of inflation of the airbag, as well as other properties.

SUMMARY OF THE INVENTION

According to one aspect of the present invention, an inflatable airbag assembly includes first and second walls sealably connected to define an inflatable bladder having an interior volume that is operable between deflated and inflated states. At least one pleat is defined within at least one of the first and second walls. The at least one pleat defines an expanded portion of the interior volume. First and second slits are defined within the first wall to define a vent, or self-actuating flow restrictor, in communication with the expanded portion of the interior volume. The self-actuating flow restrictor defines an open position with the inflatable bladder in the deflated state, and the self-actuating flow restrictor moves to a closed position as the inflatable bladder operates to the inflated state.

According to another aspect of the present invention, an inflatable airbag assembly includes an inflatable bladder operable between deflated and inflated states and having an interior volume and at least one vent in communication with the interior volume and defined by first and second slits in the bladder. The vent defines an open position with the bladder in the deflated state, and the vent moves to a closed position as the bladder operates to the inflated state.

According to another aspect of the present invention, an inflatable airbag assembly includes first and second walls sealably connected to define an inflatable bladder and first and second slits defined within the first wall. An operable portion of the first wall between the first and second slits operates between an open position defined when the bladder is deflated, to a closed position defined when the bladder is at least partially inflated.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
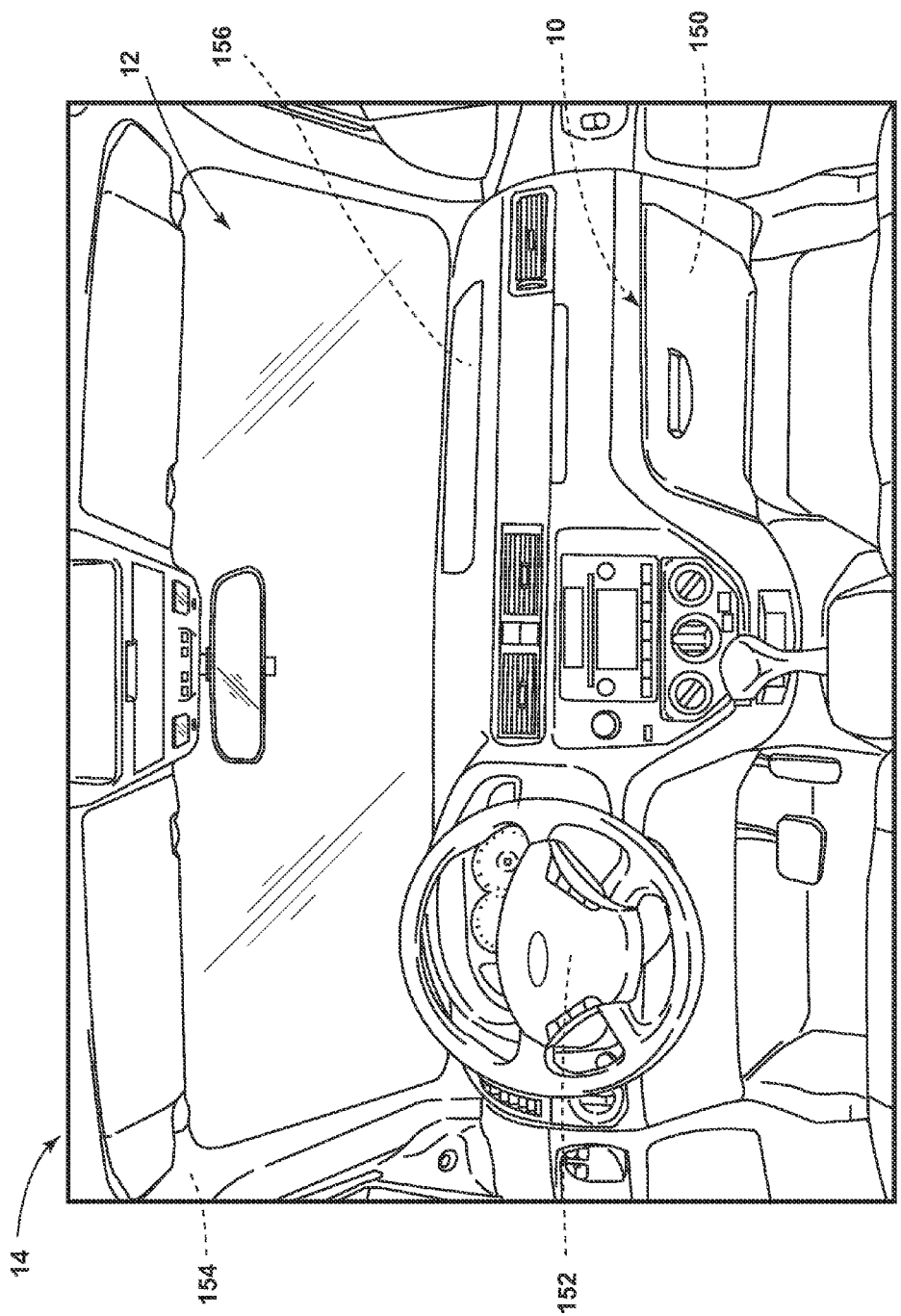
FIG. 1 is an interior perspective view of the front portion of the passenger cabin of the vehicle with an airbag assembly having an embodiment of the self-actuating flow restrictor installed therein.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
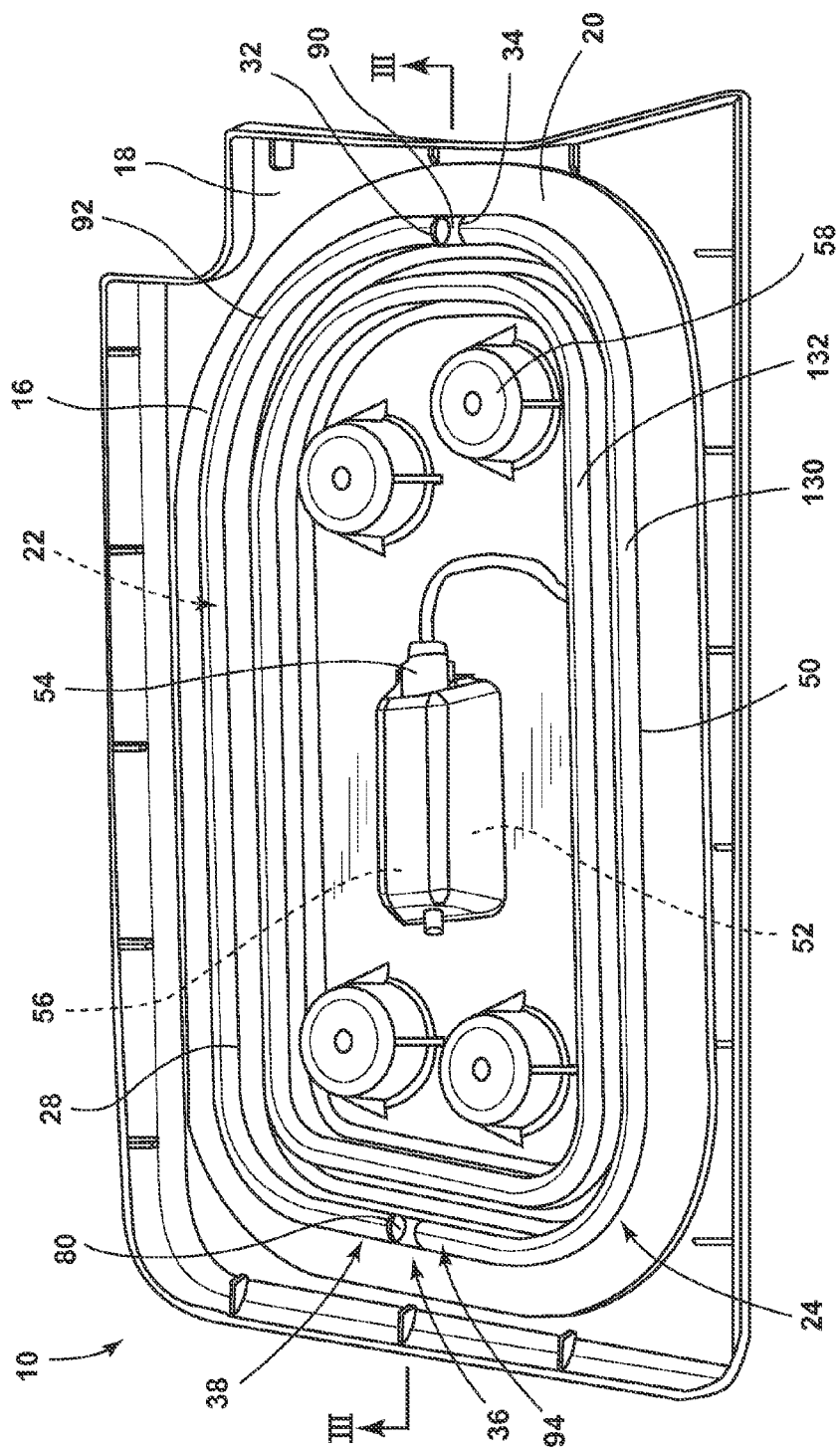
FIG. 2 is a top perspective view of an inflatable bladder of the airbag assembly with an embodiment of the self-actuating flow restrictor installed and disposed in an open position.
Figure 3:
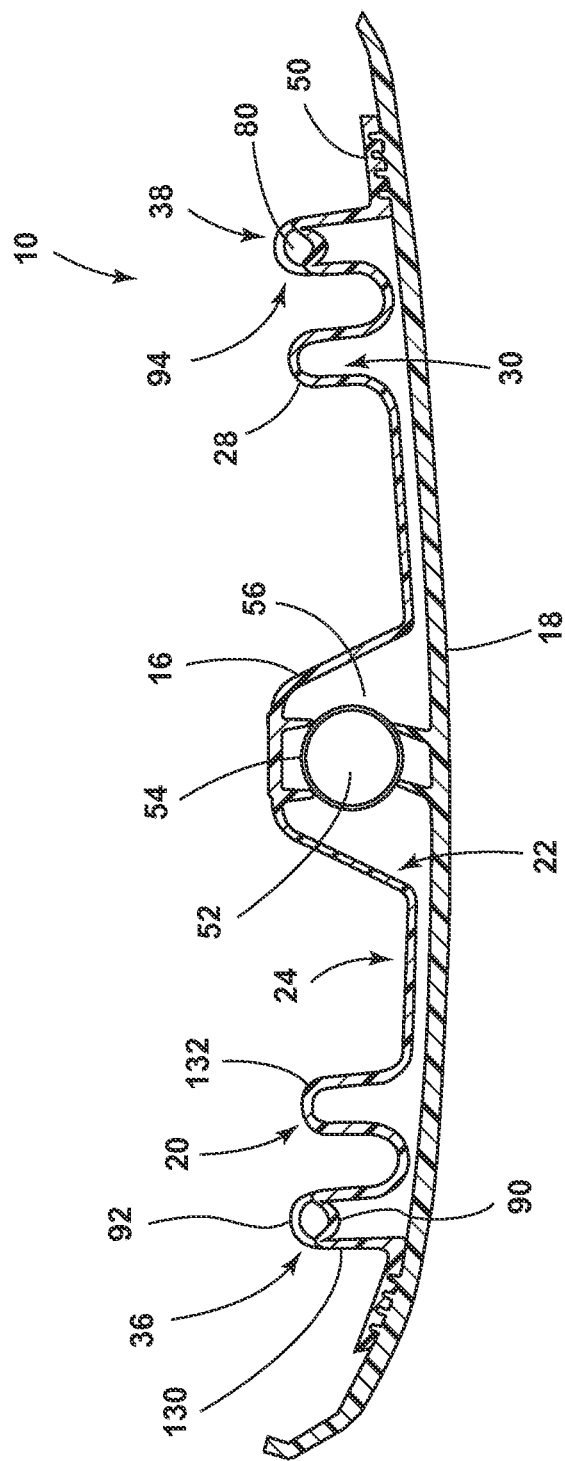
FIG. 3 is a cross-sectional view of the inflatable bladder of FIG. 2 taken along line III-III.
Figure 4:
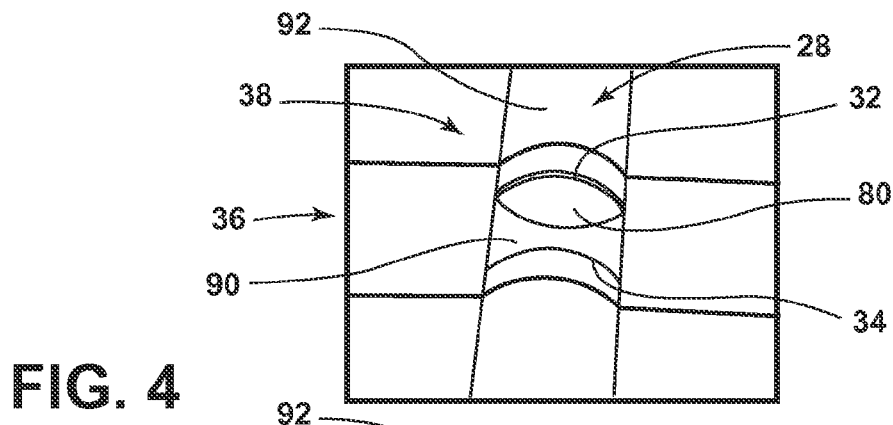
FIG. 4 is a schematic diagram of one embodiment of the self-actuating flow restrictor disposed in an open position.
Figure 11:
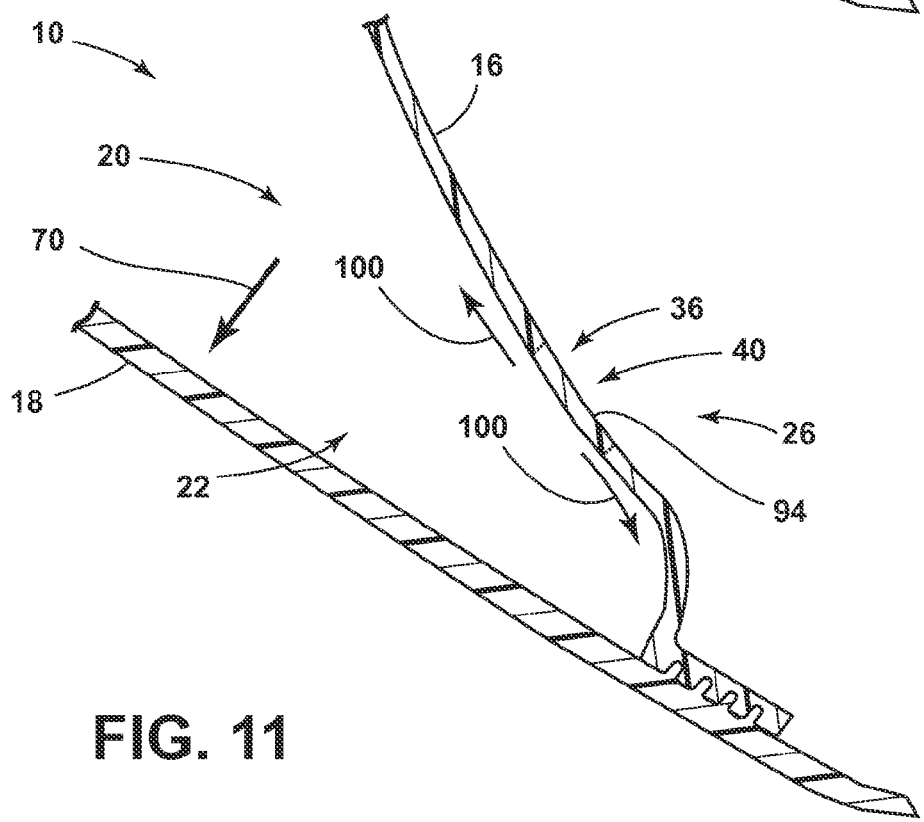
FIG. 11 is a detail cross-sectional view of the inflatable bladder of FIG. 10 with the inflatable bladder in an inflated state and the self-actuating flow restrictor in a closed position.

As shown in FIGS. 1-3, reference numeral 10 generally refers to an inflatable airbag assembly 10 installed within a passenger cabin 12 of a vehicle 14, according to one embodiment. The inflatable airbag assembly 10 includes first and second walls 16, 18 that are sealably connected to define an inflatable bladder 20, wherein the inflatable bladder 20 includes an interior volume 22 that is operable between deflated and inflated states 24, 26. At least one pleat 28 is defined within the inflatable bladder 20 within at least one of the first and second walls 16, 18. The at least one pleat 28 defines an expanded portion 30 of the interior volume 22. First and second slits 32, 34 are defined within the first wall 16, wherein the first and second slits 32, 34 define a vent, or self-actuating flow restrictor 36, that is in communication with the expanded portion 30 of the interior volume 22 of the inflatable bladder 20. The self-actuating flow restrictor 36 is adapted to define an open position 38 when the inflatable bladder 20 is in the deflated state 24. The self-actuating flow restrictor 36 is further adapted to move to a closed position 40 as the inflatable bladder 20 operates to the inflated state 26 (shown in FIG. 11).

Referring again to FIGS. 2 and 3, the first and second walls 16, 18 are joined around a closed perimeter region 50 that forms the inflatable bladder 20 that includes the interior volume 22 defined between the first and second walls 16, 18. In the various embodiments, the interior volume 22 of the inflatable bladder 20 is configured to receive an inflation gas 52 from an inflator 54 mounted in a recess 56 defined within the first wall 16 during a crash event. The first wall 16 can also include the one or more pleats 28 that are defined when the inflatable bladder 20 is in the deflated state 24. The pleats 28 allow the first wall 16 to be folded or compacted into a smaller space such that when the inflation gas 52 from the inflator 54 enters into the interior volume 22 of the inflatable bladder 20, the pleats 28 accommodate the expansion of at least the first wall 16 during inflation. Each pleat 28 defines a folded surface of the inflatable bladder 20 within one, or both, of the first and second walls 16, 18 when the inflatable bladder 20 is in the deflated state 24. As the inflatable bladder 20 moves to the inflated state 26, the pleats 28 move to form a substantially unfolded or flattened surface of the inflatable bladder 20. In various embodiments, a plurality of bosses 58 are configured to mount the first wall 16 to a reaction surface (not shown).

Referring now to FIGS. 3-11, as the interior volume 22 of the inflatable bladder 20 receives the inflation gas 52, the pleats 28 tend to unfold as a result of the expansion of the inflatable bladder 20. During inflation, the pleats 28 unfold to define a substantially even surface that is substantially free of any pleats 28 once the inflatable bladder 20 reaches the inflated state 26. In the various embodiments, as the inflatable bladder 20 reaches the inflated state 26, the force of the expansion of the inflatable bladder 20 can cause the second wall 18, which can be an interior panel, or a flexible wall, to move in an outward direction 70 to receive a portion of an occupant's body. In this manner, the inflation of the inflatable bladder 20 to the inflated state 26 serves to substantially limit and cushion the movement of the occupant's body during a collision.

In various alternate embodiments, the inflatable bladder 20 can be a portion of a larger inflatable fabric member that, during inflation, protrudes from a body panel of a passenger cabin 12 of the vehicle 14 to engage and substantially cushion a portion of the body of the occupant of the vehicle 14 during an impact condition.

Referring again to FIGS. 2-11, the first and second slits 32, 34 form the self-actuating flow restrictor 36 which can be implemented in the various airbag assemblies 10 of the passenger cabin 12 of the vehicle 14. The self-actuating flow restrictor 36 can serve to slow the inflation rate of each of the airbag assemblies 10. In this manner, and as will be described more fully below, each airbag assembly 10 can be individually tuned to have separate inflation rates depending upon the particular location and number of the self-actuating flow restrictor 36. The self-actuating flow restrictors 36 of the various airbag assemblies 10 of the vehicle 14 can be used to control the rate of inflation of the inflatable bladders 20. Accordingly, the self-actuating flow restrictors 36 can cause the various airbag assemblies 10 to substantially reach their particular inflated state 26 within a predetermined time frame in order to properly engage a portion of the occupant's body during an inflation event. Various crash test data can be used to substantially anticipate when various portions of the occupant's body may reach the airbag. Such data can be used to fine-tune the inflation rates of the airbag in order to design each of the airbag assemblies 10 within the vehicle 14 to provide cushioning for the various occupants at a predetermined time during, or after, an impact. In this manner, the various airbag assemblies 10 can be tuned during the design process to substantially minimize injury as a result of the impact. Accordingly, the size of each of the openings 80 of the self-actuating flow restrictor 36, being dictated by the sides of the first and second slits 32, 34, can be used to fine-tune the self-actuating flow restrictor 36. The number of slits, and the positioning of each of the slits, can also be used to fine-tune each of the self-actuating flow restrictors 36 of the inflatable bladder 20.

Referring again to FIGS. 2 and 3, a portion of the first wall 16 of the inflatable bladder 20 can include the first and second slits 32, 34 that define the self-actuating flow restrictor 36 of the inflatable bladder 20. It is contemplated that the first and second slits 32, 34 can be in the form of incisions through the material of the first wall 16. In this manner, the self-actuating flow restrictor 36 created by the first and second slits 32, 34 is defined by a portion of the first wall 16 between the first and second slits 32, 34. This portion of the first wall 16 is adapted to have a first surface curvature 90 that is different than a second surface curvature 92 of the adjacent area 94 surrounding the self-actuating flow restrictor 36 defined between the first and second slits 32, 34. In this manner, because the self-actuating flow restrictor 36 includes a curved contour that is different than the adjacent area 94 surrounding the self-actuating flow restrictor 36, the slits are able to define one or more openings 80 in the first wall 16 of the inflatable bladder 20. Accordingly, the first and second surface curvatures 90, 92 define at least one opening in the inflatable bladder 20, such as within one of the pleats 28. These openings 80 allow a portion of the inflation gas 52 to escape the inflatable bladder 20 during inflation.

Referring now to FIGS. 4-7, as shown in the schematic diagrams, when the self-actuating flow restrictor 36 is in an open position 38, the material of the first wall 16 between the first and second slits 32, 34 includes the first surface curvature 90 and the adjacent area 94 of the first wall 16 around the self-actuating flow restrictor 36 includes a second surface curvature 92. As shown, the first surface curvature 90 is different than the second surface curvature 92 such that at least one opening 80 is defined at the location of the first and second slits 32, 34 in the first wall 16.

Figure 5:
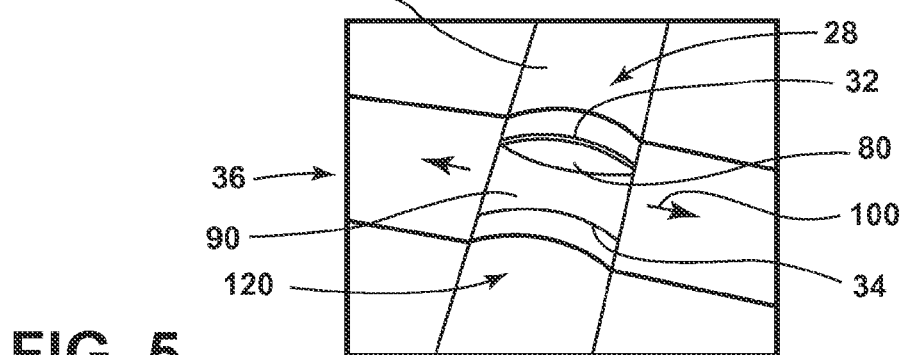
FIG. 5 is a schematic diagram of the self-actuating flow restrictor of FIG. 4 in a partially closed position.
Figure 6:
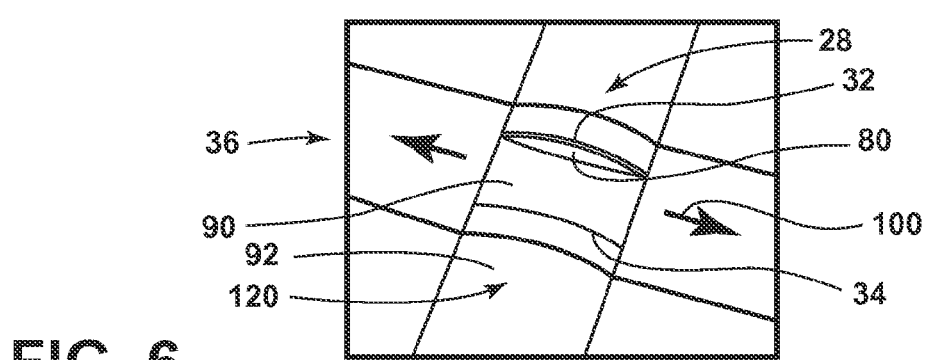
FIG. 6 is a schematic diagram of the self-actuating flow restrictor of FIG. 5 in another partially closed position.
Figure 7:
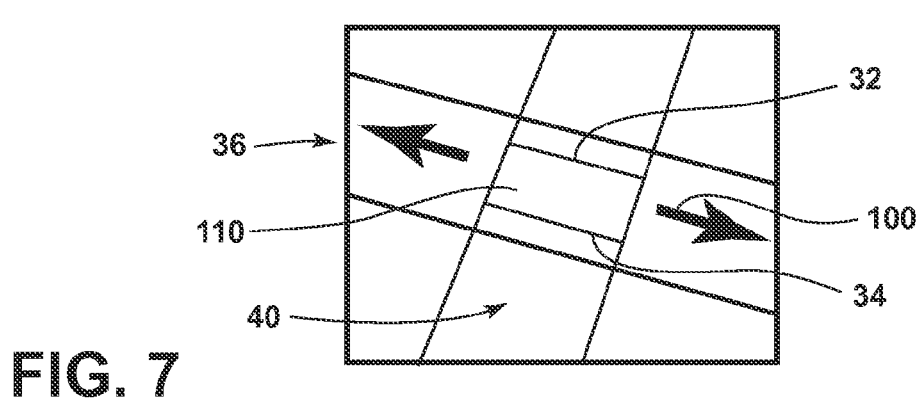
FIG. 7 is a schematic diagram of the self-actuating flow restrictor of FIG. 6 in a closed position.
Figure 8:
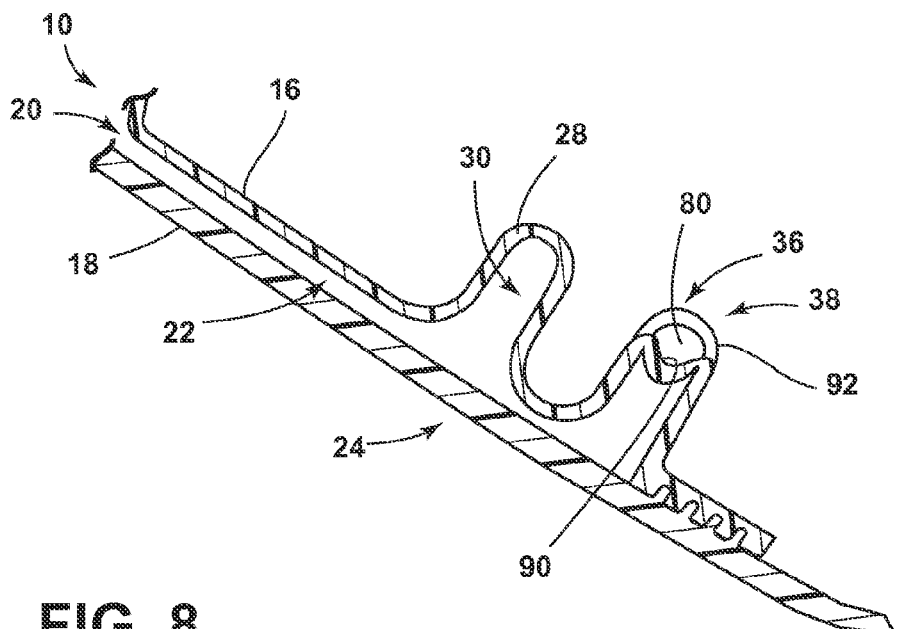
FIG. 8 is a detail cross-sectional view of the inflatable bladder of FIG. 3 taken at area VIII.
Figure 9:
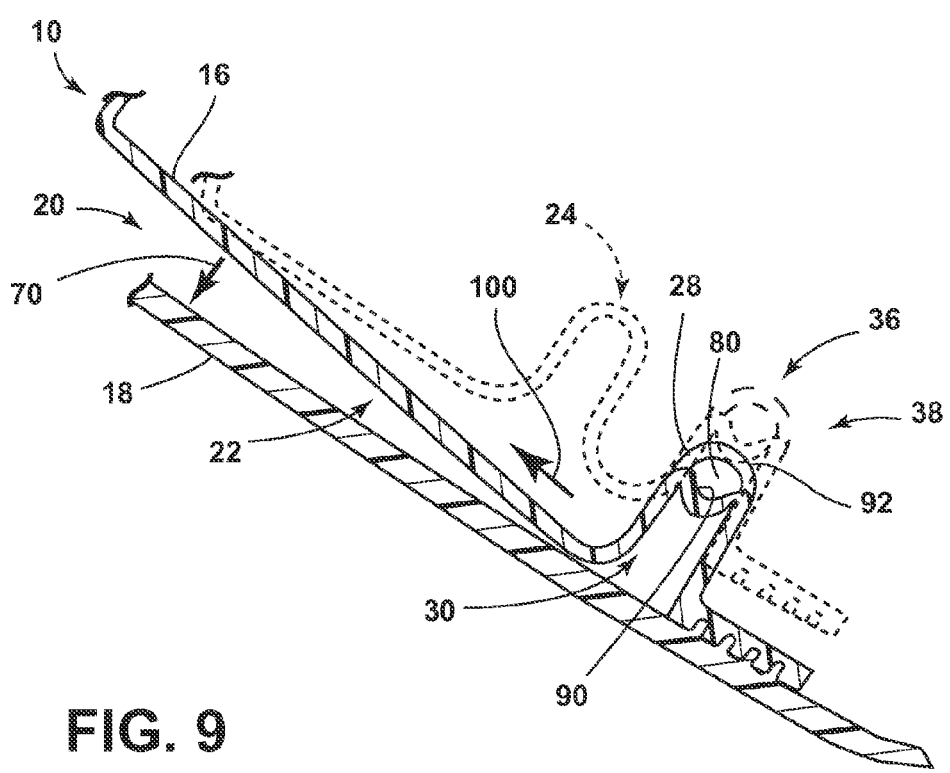
FIG. 9 is a detail cross-sectional view of the inflatable bladder of FIG. 8 showing the inflatable bladder in a partially inflated state and the self-actuating flow restrictor in the open position.
Figure 10:
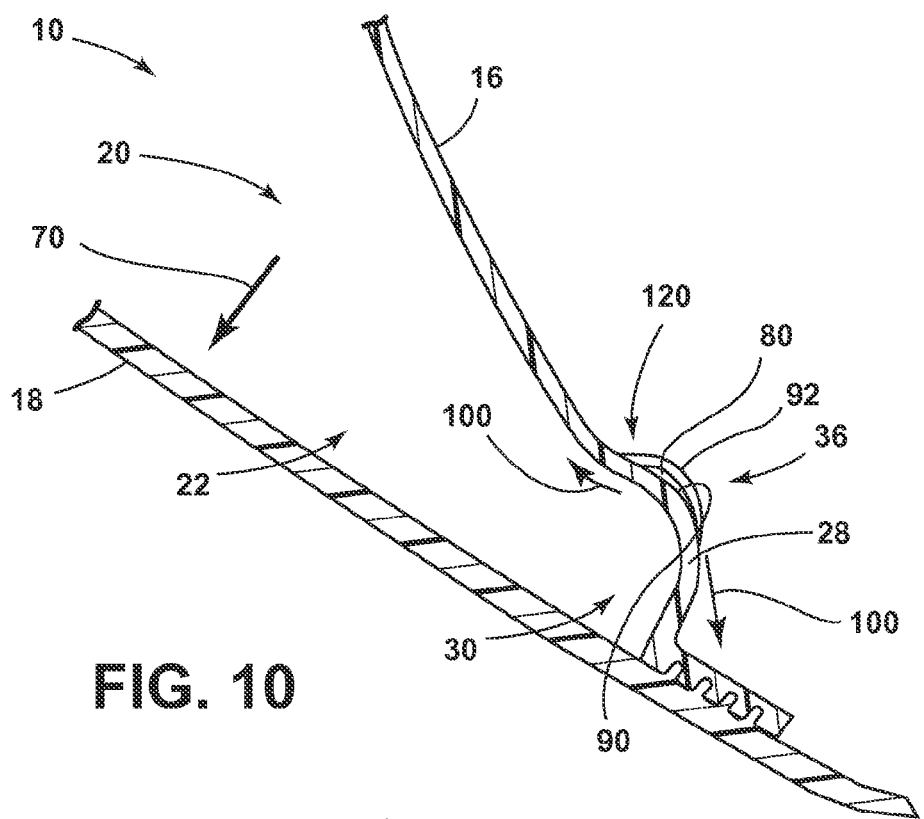
FIG. 10 is a detail cross-sectional view of the inflatable bladder of FIG. 9 with the inflatable bladder in another partially inflated state and the self-actuating flow restrictor in the partially closed position.

As shown in FIGS. 5-7, during inflation of the inflatable bladder 20, the inflatable bladder 20 becomes distended, thereby causing the pleats 28 to move from defining a folded surface of the pleat 28 to a substantially flat and unfolded surface. During inflation, the first wall 16, including portions proximate the self-actuating flow restrictor 36, are operated upon by a tensioning force 100 that pulls the portions of the self-actuating flow restrictor 36 in a lateral direction substantially parallel with the first and second slits 32, 34. This tensioning force 100 becomes greater as inflation progresses and causes the first and second surface curvatures 90, 92 of the self-actuating flow restrictor 36 and in the adjacent area 94, respectively, to substantially flatten along with the unfolding of the pleat 28. As such, when the pleat 28 is fully unfolded or flattened, as the inflatable bladder 20 reaches the inflated state 26, the first and second surface curvatures 90, 92 of the self-actuating flow restrictor 36 area, respectively, each define a third surface curvature 110. When the inflatable bladder 20 is in the inflated state 26, the third surface curvature 110 of the self-actuating flow restrictor 36 and the adjacent area 94 are substantially equal such that the first and second slits 32, 34 define a closed position 40 of the self-actuating flow restrictor 36.

Referring again to FIGS. 4-11, during inflation of the inflatable bladder 20, the self-actuating flow restrictor 36 is configured to allow certain amounts of the inflation gas 52 to escape the inflatable bladder 20 in order to slow the rate of inflation of the inflatable bladder 20. When the self-actuating flow restrictor 36 is in the open position 38 and the inflator 54 is activated, a predetermined amount of inflation gas 52 is allowed to escape the inflatable bladder 20 through the openings 80 at the first and second slits 32, 34. As the inflatable bladder 20 moves toward the inflated state 26, the pleat 28 of the inflatable bladder 20 becomes more and more unfolded and flattened. In this manner, the self-actuating flow restrictor 36, being placed under tension due to the expansion of the inflatable bladder 20 and the unfolding of the pleat 28, moves toward the closed position 40 as the inflatable bladder 20 moves toward the inflated state 26. As such, the amount of inflation gas 52 that escapes the openings 80 of the self-actuating flow restrictor 36 as the inflatable bladder 20 moves toward the inflated state 26 progressively decreases. During the inflation of the inflatable bladder 20, the self-actuating flow restrictor 36 defines a plurality of partially closed positions 120. Ultimately, when the inflatable bladder 20 is in the inflated state 26, the self-actuating flow restrictor 36 defines the closed position 40. When the self-actuating flow restrictor 36 is in the closed position 40, the first and second slits 32, 34 are closed such that little to no opening 80 exists. At this point, little to no inflation gas 52 is permitted to escape through the first and second slits 32, 34.

Referring again to FIGS. 8-11, in the various embodiments, it is contemplated that the self-actuating flow restrictor 36 can be substantially tunable to provide certain predetermined inflation characteristics for each particular airbag assembly 10 disposed within the passenger cabin 12 of a vehicle 14. By way of explanation, and not limitation, the first and second slits 32, 34 of each self-actuating flow restrictor 36 can be sized to define larger or smaller openings 80 in the first wall 16 of the inflatable bladder 20.

Typically, where a larger opening 80 is included, greater amounts of inflation gas 52 can be allowed to escape during the initial phases of an inflation event. As such, the rate of inflation of the inflatable bladder 20 can be slowed to a greater degree where the openings 80 are larger than where the openings 80 of the self-actuating flow restrictor 36 are smaller. It is also contemplated that the self-actuating flow restrictor 36 can be tuned by thickening or thinning the material of the first wall 16 within the area in which the first and second slits 32, 34 are defined. Where the material of the first wall 16 is thicker, a greater laterally directed tensioning force 100 may be necessary to move the self-actuating flow restrictor 36 to the closed position 40. More or fewer self-actuating flow restrictors 36 can also be defined within the first wall 16 at various portions of one or more of the pleats 28 of the inflatable bladder 20 to further tune the rate of inflation of the inflatable bladder 20 during an inflation event.

Referring again to FIGS. 2 and 3, it is contemplated that the first and second slits 32, 34 that define each self-actuating flow restrictor 36 of the inflatable bladder 20 can be disposed on one of the pleats 28 of the inflatable bladder 20. In the various embodiments, it is contemplated that the inflatable bladder 20 can include first and second pleats 130, 132, where one or more of the self-actuating flow restrictors 36 can be defined within either of the first and/or the second pleats 130, 132. It is also contemplated that the inflatable bladder 20 can include three or more pleats 28 with self-actuating flow restrictors 36 being disposed in any one or more of the pleats 28 defined within the inflatable bladder 20.

Referring again to FIG. 2, in the various embodiments, the first and second slits 32, 34 that define the self-actuating flow restrictor 36 within the inflatable bladder 20 are positioned distal from one another such that the first slit 32 and second slit 34 do not cross or otherwise engage one another. In this manner, the lateral tensioning force 100 placed upon the pleats 28 during an inflation event can serve to close the self-actuating flow restrictor 36 as the inflatable bladder 20 moves to the inflated state 26. It is also contemplated that the first and second slits 32, 34 can be configured parallel with one another in order to define a substantially rectangular self-actuating flow restrictor 36 having two opposing openings 80 defined at the location of each of the substantially parallel first and second slits 32, 34.

Referring again to FIGS. 1-3, it is contemplated that the pleats 28 defined within the inflatable bladder 20 can be positioned on the first wall 16 of the inflatable bladder 20. In such an embodiment, the first wall 16 of the inflatable bladder 20 is generally made of a molded plastic, thermal plastic, rubber, polymer, or other substantially flexible material that can include pleats 28 that are operable between folded and unfolded positions. Where the first wall 16 includes the one or more pleats 28, the second wall 18 can include another member similar to the first wall 16 that can also include one or more pleats 28, similar to the first wall 16. Alternatively, the second wall 18 can include an interior trim surface such as the outside of a glove box door, fabric covering, or other interior surface that is adapted to incorporate a vehicle airbag assembly 10.

Referring again to FIG. 1, it is contemplated that the inflatable bladder 20 that incorporates the self-actuating flow restrictor 36 can be positioned in any one of the airbag assemblies 10 included within the passenger cabin 12 of the vehicle 14. Such locations can include, but are not limited to, a glove box bolster 150, a steering wheel airbag 152, curtain airbag 154, passenger dash airbag 156, airbags disposed within the rear portions of the passenger cabin 12 of the vehicle 14, and other airbag locations defined within various portions of the passenger cabin 12 of the vehicle 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An inflatable airbag assembly comprising:
   first and second walls sealably connected to define an inflatable bladder having an interior volume that is operable between deflated and inflated states;
   at least one pleat defined within at least one of the first and second walls, the at least one pleat defining an expanded portion of the interior volume; and
   first and second slits separately defined within the first wall that define a self-actuating flow restrictor in communication with the expanded portion of the interior volume, wherein the self-actuating flow restrictor defines an open position with the inflatable bladder in the deflated state, and wherein the self-actuating flow restrictor moves to a closed position as the inflatable bladder operates to the inflated state, wherein the first and second slits are separated by portions of the first wall.

2. The inflatable airbag assembly of claim 1, wherein the at least one pleat includes first and second pleats.

3. The inflatable airbag assembly of claim 2, wherein the first and second slits are defined in the first pleat.

4. The inflatable airbag assembly of claim 1, wherein the first and second slits are distal from one another.

5. The inflatable airbag assembly of claim 1, wherein the first and second slits are substantially parallel.

6. The inflatable airbag assembly of claim 1, wherein when the self-actuating flow restrictor is in the open position, the self-actuating flow restrictor includes a first surface curvature and an area of the pleat adjacent to the self-actuating flow restrictor includes a second surface curvature, the first surface curvature being different than the second surface curvature, wherein the first and second surface curvatures define at least one opening in the pleat, and wherein when the self-actuating flow restrictor is in the closed position, the self-actuating flow restrictor and the area of the pleat adjacent to the self-actuating flow restrictor each include a third surface curvature such that the at least one opening in the pleat is substantially closed.

7. The inflatable airbag assembly of claim 1, wherein the inflatable bladder includes a plurality of self-actuating flow restrictors, wherein each of the plurality of self-actuating flow restrictors includes first and second slits.

8. An inflatable airbag assembly comprising:
an inflatable bladder operable between deflated and inflated states and having an interior volume; and
at least one vent in communication with the interior volume and defined by first and second slits discontinuously and separately defined in the bladder, wherein the vent defines an open position with the bladder in the deflated state, and wherein the vent moves to a closed position as the bladder operates to the inflated state.

9. The inflatable airbag assembly of claim 8, further comprising:
at least one pleat defined within the inflatable bladder, wherein the first and second slits are defined within the at least one pleat.

10. The inflatable airbag assembly of claim 8, wherein the first and second slits are distal from one another.

11. The inflatable airbag assembly of claim 10, wherein the first slit is parallel with the second slit.

12. The inflatable airbag assembly of claim 9, wherein when the vent is in the open position, the vent includes a first surface curvature and an area of the at least one pleat adjacent to the vent includes a second surface curvature, the first surface curvature being different than the second surface curvature, wherein a difference between the first and second surface curvatures defines at least one opening in the pleat, and wherein when the vent is in the closed position, the vent and the area of the at least one pleat adjacent to the vent each include a third surface curvature such that the at least one opening in the at least one pleat is substantially closed.

13. The inflatable airbag assembly of claim 8, wherein the vent is integral with the inflatable bladder.

14. The inflatable airbag assembly of claim 8, wherein the inflatable bladder includes a plurality of vents.

15. An inflatable airbag assembly comprising:
first and second walls sealably connected to define a bladder; and
first and second slits defined within the first wall, wherein an operable portion of the first wall between the first and second slits operates between an open position defined when the bladder is deflated, to a closed position defined when the bladder is at least partially inflated, the operable portion having opposing sides that directly engage the first wall.

16. The inflatable airbag assembly of claim 15, further comprising:
at least one pleat defining a folded surface within one of the first and second walls when the bladder is deflated, wherein the at least one pleat moves to form a substantially unfolded surface as the bladder is inflated, wherein the movement of the at least one pleat to form the unfolded surfaces exerts a tensioning force on each of the opposing sides of the operable portion.

17. The inflatable airbag assembly of claim 15, wherein the operable portion of the first wall between the first and second slits defines a self-actuating flow restrictor in communication with an interior volume of the bladder when the operable portion is in the open position.

18. The inflatable airbag assembly of claim 15, wherein when the operable portion is in the open position, the operable portion includes a first surface curvature and an area of the first wall adjacent to the operable portion includes a second surface curvature, the first surface curvature being different than the second surface curvature, wherein a difference between the first and second surface curvatures defines at least one opening in the first wall, and wherein when the operable portion is in the closed position, the operable portion and the area of the first wall adjacent to the operable portion each include a third surface curvature such that the first wall is substantially free of the at least one opening.

19. The inflatable airbag assembly of claim 15, wherein the first and second slits are distal from one another.

20. The inflatable airbag assembly of claim 19, wherein the first slit is substantially parallel with the second slit.

* * * * *